(12) United States Patent
Matthies et al.

(10) Patent No.: US 11,852,722 B2
(45) Date of Patent: Dec. 26, 2023

(54) METHOD AND DEVICE FOR EVALUATING AN OBJECT HEIGHT USING ULTRASONIC SIGNALS RECEIVED BY AN ULTRASONIC SENSOR MOUNTED ON A VEHICLE

(71) Applicant: Robert Bosch GmbH, Stuttgart (DE)

(72) Inventors: Christian Matthies, Stuttgart (DE); Juergen Schmidt, Magstadt (DE); Michael Schumann, Stuttgart (DE); Tom Reimann, Bissingen An der Teck (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 17/441,406

(22) PCT Filed: Apr. 9, 2020

(86) PCT No.: PCT/EP2020/060137
§ 371 (c)(1),
(2) Date: Sep. 21, 2021

(87) PCT Pub. No.: WO2020/212243
PCT Pub. Date: Oct. 22, 2020

(65) Prior Publication Data
US 2022/0179067 A1    Jun. 9, 2022

(30) Foreign Application Priority Data
Apr. 17, 2019 (DE) .......................... 102019205565.6

(51) Int. Cl.
*G01S 15/60* (2006.01)
*G01S 7/52* (2006.01)
*G01S 15/36* (2006.01)

(52) U.S. Cl.
CPC .......... *G01S 15/60* (2013.01); *G01S 7/52031* (2013.01); *G01S 7/52036* (2013.01); *G01S 15/36* (2013.01)

(58) Field of Classification Search
CPC ....................................................... G01S 15/60
See application file for complete search history.

(56) References Cited

U.S. PATENT DOCUMENTS 4,873,869 A * 10/1989 Fink .................... G01S 7/52036
600/443
2004/0183661 A1* 9/2004 Bowman ................ G08G 1/165
342/70

(Continued)

FOREIGN PATENT DOCUMENTS

DE    102005044050 A1    3/2007
DE    102012211293 A1    1/2014

(Continued)

OTHER PUBLICATIONS

International Search Report for PCT/EP2020/060137, dated Jul. 10, 2020.

*Primary Examiner* — Travis R Hunnings
(74) *Attorney, Agent, or Firm* — NORTON ROSE FULBRIGHT US LLP; Gerard Messina (57) ABSTRACT

A method for evaluating an height of an object in the surrounding environment of a vehicle, using ultrasonic signals acquired by an ultrasonic sensor mounted on the vehicle. In a measurement cycle, a first ultrasonic signal is acquired as an edge reflection or as a directly traveling echo of an object. An expectation window is calculated for an associated interior-corner reflection. A second ultrasonic signal acquired in the expectation window is recognized as an interior-corner reflection associated with the first ultrasonic signal. The first and second ultrasonic signals are combined to form a signal group. A significance is deter- (Continued)

mined for each ultrasonic signal. The signal group is assigned to a first or second echo group. The rates of the assignment to the first and to the second echo group are determined over a number of measurement cycles. An evaluation of the height is based on the first and second rates.

14 Claims, 3 Drawing Sheets

(56) References Cited

U.S. PATENT DOCUMENTS

2020/0341129 A1* 10/2020 Schumann .............. G01S 7/539
2023/0081764 A1*  3/2023 Crowe ................... G01S 15/86
                                                            367/87

FOREIGN PATENT DOCUMENTS

| | | |
|---|---|---|
| DE | 102015209939 A1 | 12/2016 |
| DE | 102017202964 A1 | 8/2018 |
| EP | 1764630 A1 | 3/2007 |
| JP | 2007505298 A | 3/2007 |
| JP | 2014074665 A | 4/2014 |
| JP | 2015166705 A | 9/2015 |
| JP | 2018204964 A | 12/2018 |

* cited by examiner

METHOD AND DEVICE FOR EVALUATING AN OBJECT HEIGHT USING ULTRASONIC SIGNALS RECEIVED BY AN ULTRASONIC SENSOR MOUNTED ON A VEHICLE

FIELD

The present invention relates to a method and to a corresponding device for evaluating an object height using ultrasound signals received by an ultrasound sensor mounted on a vehicle during a plurality of successive measurement cycles.

BACKGROUND INFORMATION

In the related art, driver assistance systems for vehicles may provide ultrasound-based driver assistance functions. Such a driver assistance system includes, for example, driver assistance functions that provide, for example, support when parking or leaving a parking space, which ensure that a vehicle can park or leave a parking space autonomously, an automatic intervention in a longitudinal and transverse guidance of the corresponding vehicle taking place.

Due to the increasing importance of safety aspects of the driver assistance functions named above, it is of great importance that an object acquired by the ultrasonic sensors of the vehicle be evaluated as to its height and whether or not the vehicle can drive over it without risk.

In the case of objects that have an extension in a direction perpendicular to the surface of the roadway, in particular wall-type objects, when an ultrasonic signal is emitted, a plurality of echo signals are typically received. In principle, an object height can be estimated for example from the runtime differences. However, in particular in the case of wall-type objects there is the problem that an ultrasonic signal reflected back to the ultrasonic sensor by the upper edge of the wall may be very much weaker, due to the reflection properties of such objects, than an ultrasonic signal that is reflected back to the ultrasonic sensor by the so-called interior corner, i.e. the area of contact of the object with the ground.

German Patent Application No. DE 10 2012 211 293 A1 describes a method for operating an environmental acquisition system of a vehicle having at least one ultrasonic sensor. Here, the ultrasonic sensor sends out frequency-modulated ultrasonic signals. The ultrasonic sensor and/or one or more further ultrasonic sensors also receive ultrasonic signals of the emitted ultrasonic signals. In this method, it is provided that the ultrasonic signals are filtered so that ground ultrasonic signal portions are suppressed. An item of amplitude information and an item of phase information are determined from the received ultrasonic signals. In addition, a ground clutter envelope curve is determined as a function of time. A signal evaluation function is also ascertained that is a function of the amplitude information, the phase information, and preferably also the ground clutter envelope curve. In the same document, a corresponding environmental acquisition system is described.

German Patent Application No. DE 10 2015 209 939 A1 describes a method for evaluating a significance of an ultrasonic signal, the ultrasonic signal being received by an ultrasonic sensor mounted on a vehicle during a measurement cycle. Here, the significance of each received ultrasonic signal is evaluated on the basis of at least one parameter that includes items of information that are contained in a received signal. The received signal is produced by the ultrasonic sensor from ultrasonic signals received by it during the measurement cycle.

The significance of a received ultrasonic signal indicates a probability that this signal originates from the reflection of an emitted ultrasonic signal by at least one object.

SUMMARY

In accordance with the present invention, a method is provided for evaluating an object height of an object in the surrounding environment of a vehicle, the evaluation being carried out using ultrasonic signals that are acquired by an ultrasonic sensor mounted on the vehicle.

In accordance with an example embodiment of the present invention, in a measurement cycle, a first ultrasonic signal is acquired as an edge reflection or as a directly traveling echo of an object. From this, an expectation window is calculated for an associated interior-corner reflection. A second ultrasonic signal acquired in the expectation window is recognized as the interior-corner reflection associated with the first ultrasonic signal, and the first ultrasonic signal and the second ultrasonic signal are combined to form a signal group. For each ultrasonic signal, a significance is now determined. Through comparison of the significances, the signal group is assigned to a first echo group or to a second echo group.

The rates of the assignment to the first echo group and to the second echo group are determined over the determined number of measurement cycles, and an evaluation of the object height takes place as a function of the first rate and of the second rate.

The method according to an example embodiment of the present invention has the following steps:

In a measurement cycle, there takes place:
  a. Acquisition of a first ultrasonic signal as edge reflection or as a directly traveling echo of an object;
  b. Calculation of an expectation window for an associated interior-corner reflection;
  c. Acquisition of a second ultrasonic signal;
  d. If the second ultrasonic signal is acquired in the expectation window: identification of the second ultrasonic signal as interior-corner reflection associated with the first ultrasonic signal, and combination of the first ultrasonic signal and the second ultrasonic signal to form a signal group;
  e. Determination of a first significance of the first ultrasonic signal and determination of a second significance of the second ultrasonic signal, the significance of each acquired ultrasonic signal indicating a probability that the acquired ultrasonic signal is a reflection of an emitted ultrasonic signal by at least one object;
  f. Assignment of the signal group to an object in the surrounding environment of the vehicle;
  g. Comparison of the first significance and the second significance, and, as a function of the comparison, assignment of the signal group to a first echo group or to a second echo group;

After a determined number of measurement cycles, there takes place:
  Determination of a first rate of the assignment of a signal group to the first echo group over the determined number of measurement cycles;
  Determination of a second rate of the assignment of a signal group to the second echo group over the determined number of measurement cycles;
  Evaluation of the object height as a function of the first rate and the second rate.

It is first assumed that the object that reflected the acquired ultrasonic signals is a wall-type object. "Wall-type" means that the object has an extension perpendicular to the roadway surface and also has a certain extension in a longitudinal direction (in contrast to, for example, a pole). Examples of wall-type objects are walls, house walls, or high curbstones.

Accordingly, during a measurement cycle there first takes place an acquisition of a first ultrasonic signal. In the case in which the reflecting object has a height that is less than the height of installation of the sensor, this ultrasonic signal represents the edge reflection. In the case of an object having a height greater than the installation height of the sensor, the ultrasonic sensor represents the directly traveling echo, i.e. the echo thrown back on a direct path by the surface of the object. In both cases, this is the temporally first acquired echo signal, because the sound waves that cause the signal in both cases travel the shortest path to the sensor. Subsequently, an expectation window is calculated for an associated interior-corner reflection of the object. The expectation window is a defined time interval within the measurement cycle in which the interior-corner reflection, i.e. the echo signal reflected by the spatial region in which the object stands on the ground, is expected, under the assumption that the previously acquired first ultrasonic signal is an edge reflection or a so-called directly traveling echo. The boundaries of the expectation window can be calculated from the geometrical properties of the ultrasonic sensor, such as its height of installation, and the assumption that the object is a wall-type object. If a second ultrasonic signal is now acquired that is within the previously calculated expectation window for the interior-corner reflection, then the second ultrasonic signal is identified as an interior-corner reflection associated with the first ultrasonic signal, and the first ultrasonic signal and the second ultrasonic signal are combined to form a signal group.

In addition, a first significance of the first ultrasonic signal and a second significance of the second ultrasonic signal are determined, the significance of each acquired ultrasonic signal indicating a probability that this signal originates from the reflection of an emitted ultrasonic signal by at least one object.

The signal group is assigned to an object in the vehicle surrounding environment, for example by trilateration. In addition, a comparison is made of the first significance and the second significance. As a function of the comparison, the signal group is assigned to a first echo group or to a second echo group. The first echo group can be defined such that the relation and/or the difference between the first significance and the second significance indicates an object having a height greater than a specified height threshold. The second echo group can be defined in such a way that the relation and/or the difference between the first significance and the second significance indicates an object having a height smaller than a specified height threshold.

The above-describe steps a. through g. are carried out for a multiplicity of measurement cycles. Over a determined number x of measurement cycles, a first rate of the assignment of a signal group to the first echo group and a second rate of the assignment of a signal group to the second echo group are determined. For example, the first and the second rate can be determined over a number of x=16 measurement cycles. In particular, the first rate and the second rate are continuously (in floating fashion) determined over the last x measurement cycles. As a function of the first rate and of the second rate, there now takes place an evaluation of the object height, in particular as to whether or not the vehicle can drive over the object without risk.

Thus, a targeted use is made of the geometrical relation between the first acquired ultrasonic signal (edge reflection or direct echo) and the second acquired ultrasonic signal (interior corner) from low walls, taking into account significance relations or significance differences relative to one another in the acquired ultrasonic signals.

Preferably, the expectation window is calculated for the interior-corner reflection based on a runtime of the first ultrasonic signal, the installation height of the ultrasonic sensor on the vehicle, measured over the surface of the roadway, and/or a minimum object height, the minimum object height being determined in particular as a function of the type of vehicle, and in particular indicating an upper boundary value for the ability to drive over an object. The minimum object height can for example be 30 cm for a typical passenger vehicle. The installation height of the ultrasonic sensor can be for example 45 cm. The runtime of the first ultrasonic signal here represents the distance of the ultrasonic sensor from the object, in particular the shortest distance.

In a possible embodiment of the present invention, the expectation window is designed such that the lower boundary of the expectation window is calculated from the determined minimum object height, and the upper boundary of the expectation window is calculated under the assumption that an object having a height greater than or equal to the sensor installation height is present. Both variables are to be calculated with a tolerance, on the basis of potentially occurrent measurement errors. If the object has a height smaller than the sensor installation height, then the echo is within the expectation window.

From the related art, in particular from German Patent Application No. DE 10 2015 209 939 A1, various possibilities are available for assigning to an ultrasonic signal a significance that indicates a probability that the ultrasonic signal is a reflection of an emitted ultrasonic signal by at least one object.

Preferably, a significance of the first ultrasonic signal and/or a significance of the second ultrasonic signal are determined on the basis of at least one parameter that includes information that is contained in a received signal, in particular an amplitude and/or a correlation factor. Here, the received signal is produced by the ultrasonic sensor from ultrasonic signals received by this sensor during the measurement cycle.

The significance is in particular determined by: Division of a spatial region that extends from the ultrasonic sensor up to a maximum range of the ultrasonic sensor into a plurality of continuous subregions that succeed one another, and selection of the at least one parameter to be used for the evaluation of the significance of each received ultrasonic signal from a predefined parameter group, as a function of a position of the subregion in which the corresponding ultrasonic signal originated.

Particularly preferably, the significance of each received ultrasonic signal is evaluated using a significance scale having a plurality of discrete significance levels, the determination of the significance of the first ultrasonic signal and/or of the significance of the second ultrasonic signal being done by assigning a particular significance level to the ultrasonic signal.

In particular, here four significance levels are provided, including a first significance level "low," a second significance level "medium," a third significance level "high," and a fourth significance level "very high," the significance level "low" corresponding to a low probability that an ultrasonic signal originates from a reflection of an emitted ultrasonic signal by at least one object, the significance level "medium" corresponding to a medium probability that an ultrasonic signal originates from a reflection of an emitted ultrasonic signal by at least one object, the significance level "high" corresponding to a high probability that an ultrasonic signal originates from a reflection of an emitted ultrasonic signal by at least one object, and the significance level "very high" corresponding to a very high probability that an ultrasonic signal originates from a reflection of an emitted ultrasonic signal by at least one object.

For example, the significance levels may correspond to the following probabilities:
low: 30 to 50%
medium: 51 to 70%
high: 71 to 90%
very high: 91 to 100%

Further possibilities and exemplary embodiments for the determination and evaluation of a significance of an acquired ultrasonic signal can be found in DE 10 2015 209 939 A1.

In a preferred embodiment of the present invention, a signal group including a first ultrasonic signal and a second ultrasonic signal is assigned to a first echo group when the difference between the first significance and the second significance is low, in particular when two ultrasonic signals have the same significance level, or when the first ultrasonic signal has a very high significance, in particular the significance level "very high." The assignment of the signal group to the first echo group indicates a rather high object.

Further preferably, a signal group including a first ultrasonic signal and a second ultrasonic signal is assigned to a second echo group when the first ultrasonic signal has a low significance, in particular the significance level "low," and the second ultrasonic signal has a significance that is high in comparison with the first ultrasonic signal, in particular one of the significant levels "high" or "very high." The assignment of the signal group to the first echo group indicates a rather low object.

In a preferred exemplary embodiment of the present invention, the object height is evaluated by comparing the determined first rate of the assignment of a signal group to the first echo group with a first threshold value. In addition or alternatively, the determined second rate of the assignment of a signal group to the second echo group is compared to a second threshold value.

In addition or alternatively, moreover, the sum of the first rate and the second rate can be compared to a third threshold value. Here, preferably the third threshold value is preferably greater than the first threshold value and greater than the second threshold value. This takes account of the circumstance that even in the frequent cases in which all measurements relate to the same object, rates greater than zero are measured for both echo groups, which is due to the fact that, depending on the angle of observation, the echo amplitudes and thus the significances can vary. Through the exchange of the echo group of individual signal groups, these groups are now missing the corresponding other echo group, and the rate required to exceed the threshold may not be reached. For this reason, preferably the sum of the two rates is also counted, the corresponding third threshold value being selected higher than the first and second threshold values in order to avoid the production of false evaluation results (false positives).

In particular strongly structured wall-type objects, such as walls, may also supply more than two echo signals. It is advantageous if, in this case, more than one second ultrasonic signal is combined with the first ultrasonic signal to form a signal group, such that at least the temporally last-acquired second ultrasonic signal of the group should be situated in the expectation window. In the assignment of such a signal group to one of the echo groups, the significances of all ultrasonic signals contained in the signal group can be evaluated and compared.

If the object is evaluated as an object that is higher than the determined minimum object height of, for example, 30 cm, then a warning can be triggered.

Preferably, an evaluation of the object type that is a function of the first rate and of the second rate takes place only when the vehicle is in motion. Alternatively, given a measurement while the vehicle is standing still, higher evaluation threshold values can be set for the first threshold value and/or for the second threshold value and/or for the third threshold value in the evaluation. In this way, incorrect evaluations of the object height are prevented.

According to a second aspect of the present invention, an ultrasonic sensor system for a vehicle is provided that includes at least one ultrasonic sensor that is designed to emit ultrasonic signals and to acquire ultrasonic signals, reflected by an object, of the emitted ultrasonic signals, and includes a computing unit that is designed to carry out a method realized as described above for evaluating an object height using the ultrasonic signals acquired by the ultrasonic sensor.

According to a third aspect of the present invention, a computer program is provided that includes program code for carrying out the method according to the present invention when the computer program is executed on a computer.

The present invention enables a robust classification of objects on the ground that cannot be driven over, such as small supporting walls or walls, in particular having heights below the sensor installation height, and thus reliably helps to avoid damage to the vehicle.

BRIEF DESCRIPTION OF THE DRAWINGS

Below, specific example embodiments of the present invention are described in detail with reference to the Figures.

DETAILED DESCRIPTION OF EXAMPLE EMBODIMENTS

In the following description of the exemplary embodiments of the present invention, identical elements are designated with identical reference characters, and a repeated description of these elements may be omitted. The Figures represent the subject matter of the present invention only schematically.

An evaluation, to be carried out according to a first specific embodiment of the present invention, of a significance of each ultrasonic signal received by an ultrasonic sensor mounted on a vehicle during a measurement cycle is described in connection with FIG. 1. Here, the significance of each received ultrasonic signal indicates a probability that this signal originates from reflection of an ultrasonic signal emitted by the ultrasonic sensor at a beginning of a measurement cycle by at least one object. The at least one object is situated in a surrounding environment of the vehicle. Each received ultrasonic signal that originates from reflection of the emitted ultrasonic signal by the at least one object is also referred to in the following as an object echo signal.

Figure 1:
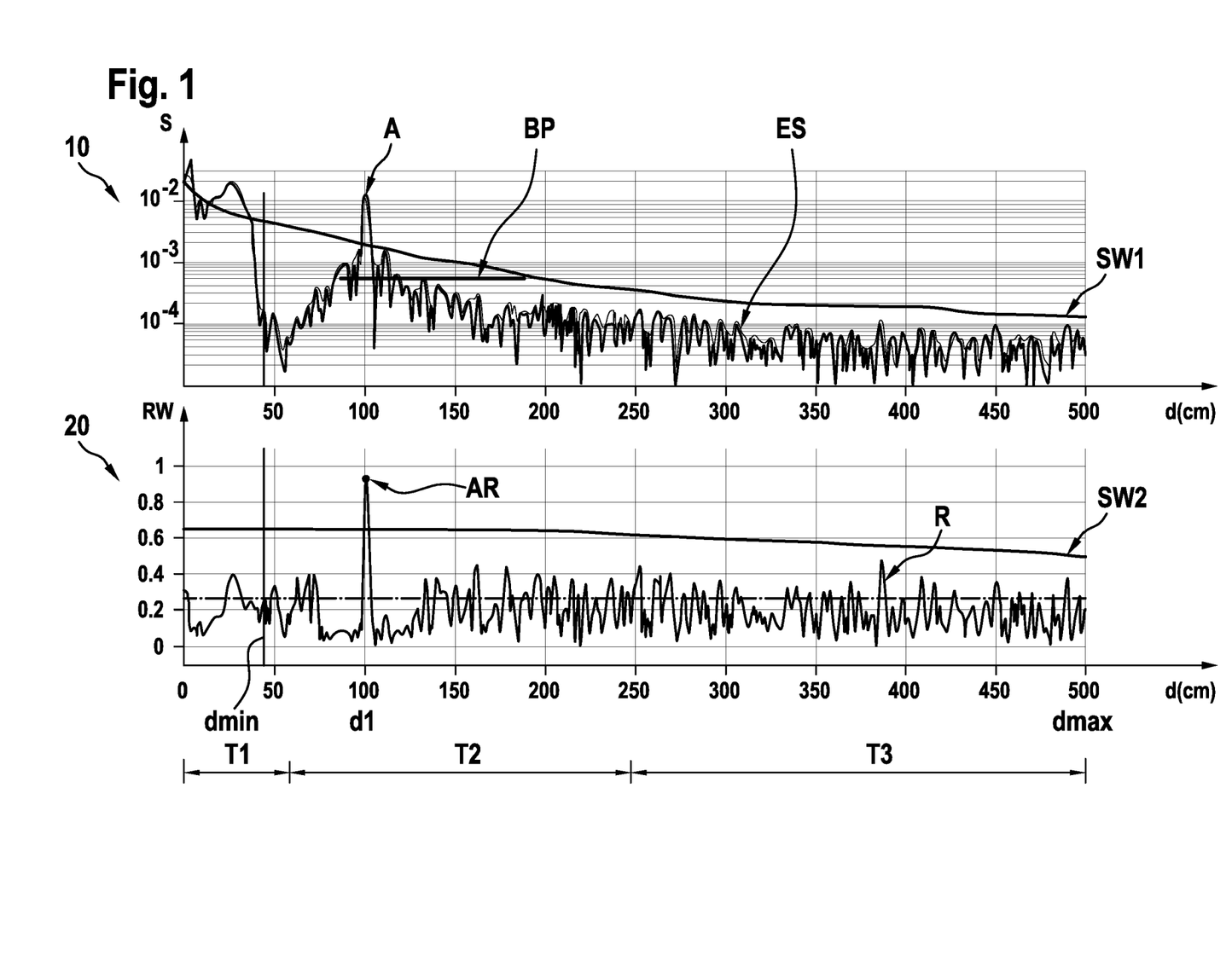
FIG. 1 shows, in each case as a function of a distance from an ultrasonic sensor, curves of a received signal occurring during a measurement cycle of the ultrasonic signal, and of an item of phase information contained in the received signal.

FIG. 1 includes a diagram 10 that indicates a curve of a signal strength of a received signal ES, occurring during the measurement cycle, of the ultrasonic sensor as a function of a distance from the ultrasonic sensor. Here, a distance value range of the distance from the ultrasonic sensor extends from a minimum distance value of zero up to a maximum distance value dmax. The maximum distance value dmax agrees with a value dmax of a maximum range of the ultrasonic sensor. Received signal ES is produced by the ultrasonic sensor from ultrasonic signals received by the sensor during the measurement cycle. Using received signal ES, an amplitude A of the received signal is determined as a function of the distance from the ultrasonic sensor.

FIG. 1 further includes a diagram 20 that indicates a curve of an item of phase information R, contained in received signal ES, as a function of the distance from the ultrasonic sensor. In order to produce a correlation signal, received signal ES is correlated with a filter function of an optimal filter. Phase information R here agrees with a correlation factor R that is determined using the correlation signal as a function of the distance from the ultrasonic sensor. Correlation factor R indicates a phase correlation between each received ultrasonic signal and the emitted ultrasonic signal, and has values between 0 and 1. In other words, correlation factor R is a measure of the similarity between each received ultrasonic signal and the filter function of the optimal filter.

In FIG. 1, a first axis that indicates unitless values, which can have the signal strength of received signal ES normed with a predefined norming variable, is designated by S. In FIG. 1, a second axis that indicates phase information values that can have phase information R is designated RW. In FIG. 1, a third axis that indicates distance values given in centimeters, which can have the distance from the ultrasonic sensor, is designated d.

In FIG. 1, a value dmin of a minimum range of the ultrasonic sensor and the value dmax of the maximum range of the ultrasonic sensor are also entered.

According to the first specific embodiment, a spatial region that extends from the ultrasonic sensor up to the maximum range of the ultrasonic sensor is divided into a first subregion T1, a second subregion T2, and a third subregion T3. The three subregions T1, T2, T3 are each continuous and succeed one another immediately. First subregion T1 is immediately adjacent to the ultrasonic sensor. Third subregion T3 extends up to the maximum range of the ultrasonic sensor.

According to the first specific embodiment, a predefined parameter group is used having three parameters A, R, A/BP. Here, a first parameter A of the predefined parameter group agrees with the amplitude A, which is a function of the distance from the ultrasonic sensor, of received signal ES. A second parameter R of the predefined parameter group also agrees with the item of phase information R, which is a function of the distance from the ultrasonic sensor. In addition, a third parameter A/BP of the predefined parameter group agrees with a quotient of first parameter A and a ground clutter level BP of received signal ES. Ground clutter level BP does not change during a measurement cycle, and is determined on the basis of a signal strength or amplitude of received signal ES occurring in a predefined segment of received signal ES. The predefined segment results from a reception of ultrasonic signals that originate from reflection of the emitted ultrasonic sensor by the ground on which the vehicle is situated.

According to the first specific embodiment, for each subregion T1, T2, T3 of the three subregions T1, T2, T3 of the spatial region, at least one parameter A, R, A/BP of the predefined parameter group is selected for the evaluation of the significance of each received ultrasonic signal that originated in the corresponding subregion T1, T2, T3 of the spatial region. In addition, according to the first specific embodiment a parameter value range, valid for a subregion T1, T2, T3 of the three subregions T1, T2, T3 of the spatial region, of each parameter A, R, A/BP, selected for the corresponding subregion, of the predefined parameter group is divided into a first, second, third, and fourth subregion. This is done for each subregion T1, T2, T3 of the three subregions. Each of the four subregions of each parameter value range are continuous and succeed one another immediately. In addition, parameter values of each parameter value range are evaluated using one and the same parameter value scale, having a first, second, third, and fourth parameter value level. Here, the first parameter value level is assigned to parameter values of the first subregion of each parameter value range. In this way, the parameter values of the first subregion of each parameter value range are each rated as "low." In addition, the second parameter value level is assigned to parameter values of the second subregion of each parameter value range. In this way, the parameter values of the second subregion of each parameter value range are each rated as "medium." The third parameter value level is also assigned to parameter values of the third subregion of each parameter value range. In this way, the parameter values of the third subregion of each parameter value range are each rated as "high." In addition, the fourth parameter value level is assigned to parameter values of the fourth subregion of each parameter value range. In this way, the parameter values of the fourth subregion of each parameter value range are each rated as "very high."

According to the first specific embodiment of the present invention, in addition, the significance of each received ultrasonic signal is evaluated using a significance scale having a first, second, third, and fourth significance level. Here, a significance of first significance level is rated as "low." In addition, a significance of second significance level is rated as "medium." In addition, a significance of third significance level is rated as "high." In addition, a significance of fourth significance level is rated as "very high."

According to the first specific embodiment, first parameter A and/or second parameter R are selected for the evaluation of the significance of each received ultrasonic signal that originated in first subregion T1 of the spatial region. In the following, each received ultrasonic signal that originated in first subregion T1 of the spatial region is also in each case designated as a first ultrasonic signal. Here, the significance of each first ultrasonic signal is rated as "very high" if, during reception thereof, the parameter value of first parameter A or of second parameter R is rated as "very high." In addition, the significance of each first ultrasonic signal is rated as "high" if, during reception thereof, the parameter value of first parameter A and of second parameter R is rated as "high."

In addition, the significance of each first ultrasonic signal is rated as "medium" if, during reception thereof, the parameter value of first parameter A is rated as "medium" and the parameter value of second parameter R is rated as "high," medium, or "low." In addition, the significance of each first received ultrasonic signal is rated as "low" if, during reception thereof, the parameter value of the first parameter A is rated as "low" and the parameter value of the second parameter R is rated as "high" or "medium" or "low."

According to the first specific embodiment, the second parameter R and/or third parameter A/BP are selected for the evaluation of the significance of each received ultrasonic signal that originated in second subregion T2 of the spatial region. In the following, each received ultrasonic signal that originated in second subregion T2 of the spatial region is also in each case designated as a second ultrasonic signal. Here, the significance of each second ultrasonic signal is rated as "very high" if, during reception thereof, the parameter value of second parameter R or of third parameter A/BP is rated as "very high."

In addition, the significance of each second ultrasonic signal is rated as "high" if, during reception thereof, the parameter value of second parameter R is rated as "high" or "medium" and the parameter value of third parameter A/BP is rated as "high."

In addition, the significance of each second ultrasonic signal is rated as "medium" if, during reception thereof, the parameter value of second parameter R is rated as "medium" and the parameter value of third parameter A/BP is rated as "medium" or "low." In addition, the significance of each second received ultrasonic signal is rated as "low" if, during reception thereof, the parameter value of the second parameter R is rated as "low" and the parameter value of the third parameter A/BP is rated as "high" or "medium" or "low."

According to the first specific embodiment, the second parameter R is selected for the evaluation of the significance of each ultrasonic signal that originated in third subregion T3 of the spatial region. In the following, each received ultrasonic signal that originated in third subregion T3 of the spatial region is in each case also designated a third ultrasonic signal. Here the significance of each third ultrasonic signal is rated as "very high" if, during reception thereof, the parameter value of second parameter R is rated as "very high." In addition, the significance of each third ultrasonic signal is rated as "high" if, during reception thereof, the parameter value of second parameter R is rated as "high." In addition, the significance of each third ultrasonic signal is rated as "medium" if, during reception thereof, the parameter value of second parameter R is rated as "medium." In addition, the significance of each third ultrasonic signal is rated as "low" if, during reception thereof, the parameter value of second parameter R is rated as "low."

FIG. 1 also shows the curve of a first threshold value SW1 and the curve of a second threshold value SW2. Here, first threshold value SW1 is exceeded by received signal ES during the reception of each object echo signal. Second threshold value SW2 is also exceeded by phase information R during the reception of each object echo signal. FIG. 1 shows that during the measurement cycle a first object echo signal is received that originated in second subregion T2 of the spatial region. FIG. 1 also shows that a location of origination of the first object echo signal is situated at a distance from the ultrasonic sensor that has a first distance value d1 of approximately 100 cm. FIG. 1 also shows that a first amplitude value assumed by amplitude A of received signal ES at first distance value d1 is greater than first threshold value SW1 and is significantly greater than ground clutter level BP. Here, a parameter value assumed by third parameter A/BP at first distance value d1 is calculated as a quotient of the first amplitude value and ground clutter level BP, and is rated as "high." FIG. 1 also shows that a first phase information value assumed by an amplitude AR of second parameter R at first distance value d1 is above second threshold value SW2 and is greater than 0.9. The first phase information value is rated as "high." This means that, according to the first specific embodiment, the significance of the first object echo signal is rated as "high."

Figure 2A:
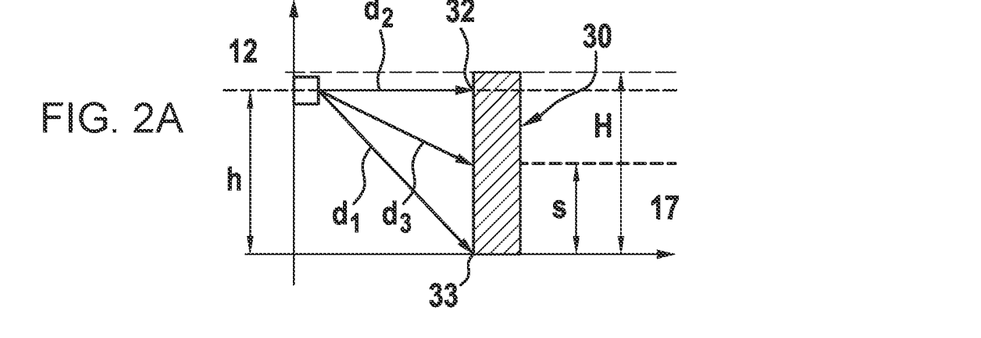
FIGS. 2A and 2B schematically show an example of a configuration of an ultrasound sensor on a vehicle during an approach to a wall-type object.

FIG. 2A schematically shows an ultrasonic sensor 12. Ultrasonic sensor 12 is mounted at an installation height h above roadway surface 17, for example on the rear of a vehicle (not shown). In the surrounding environment of the vehicle there is situated a wall-type object 30, for example a low wall. In this example, the object has a height H that is greater than installation height h of sensor 12.

At the beginning of a measurement cycle, ultrasonic sensor 12 sends out an ultrasonic signal. The ultrasonic signal is reflected by an object 30 and reflected ultrasonic signals are acquired by ultrasonic sensor 12. The temporally first-acquired ultrasonic signal corresponds to the reflection by the point 32 on the surface of object 30 situated directly opposite ultrasonic sensor 12. Point 32 has the shortest distance $d_2$ from ultrasonic sensor 12. It follows from this that the reflected ultrasonic signal going out from this point has the shortest runtime. This ultrasonic signal is also referred to as directly traveling signal or as direct echo.

The so-called interior-corner reflection is the by interior-corner region 33, i.e. the region at which the wall-type structure of object 30 stands on the ground surface and forms a substantially right-angle-shaped reflecting area. The interior-corner reflection is received temporally later than the direct echo, because distance $d_1$ between ultrasonic sensor 12 and interior-corner region 33 is greater than distance $d_2$ between ultrasonic sensor 12 and point 32 situated directly opposite ultrasonic sensor 12.

Height of installation h of ultrasonic sensor 12 is known. In addition, the minimum object height S at which an object is no longer evaluated as being capable of being driven over is known. From geometric considerations, based on the time of acquisition of the directly traveling echo an expectation window can be calculated for the acquisition of the interior-corner reflection. If a second ultrasonic signal is in fact received within this expectation window, then this can be combined with the first ultrasonic signal to form a signal group.

Figure 2B:
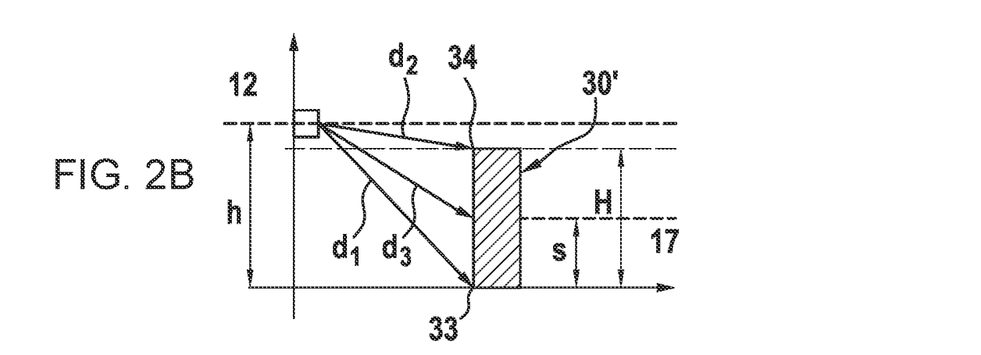

FIG. 2B schematically shows an ultrasonic sensor 12. Ultrasonic sensor 12 is again situated at a height of installation h above roadway surface 17, for example on the rear of a vehicle (not shown). In the surrounding environment of the vehicle there is situated a wall-type object 30', for example a low wall. In this example, the object has a height H' that is smaller than the installation height of sensor 12, but is greater than height threshold s, which indicates an object height such that, when exceeded, an object is evaluated as no longer capable of being driven over.

At the beginning of a measurement cycle, ultrasonic sensor 12 sends out an ultrasonic signal. The ultrasonic signal is reflected by object 30, and reflected ultrasonic signals are acquired by ultrasonic sensor 12. The temporally first-acquired ultrasonic signal corresponds to the reflection by the upper edge 34 of object 30'. Here, point 34 has the shortest distance $d_2$ from ultrasonic sensor 12, even if it is not situated directly opposite ultrasonic sensor 12, as in the example according to FIG. 2A. It follows from this that the reflected ultrasonic signal going out from this point 34 has the shortest runtime of the acquired reflected ultrasonic signals. This ultrasonic signal is also referred to as edge reflection.

Here as well, again from geometric considerations, and based on the time of acquisition of edge reflection 15, an expectation window can be calculated for the acquisition of the interior-corner reflection from interior-corner region 33 at distance $d_1$. If a second ultrasonic signal is in fact received within this expectation window, then this can be combined with the first ultrasonic signal to form a signal group.

Figure 3:
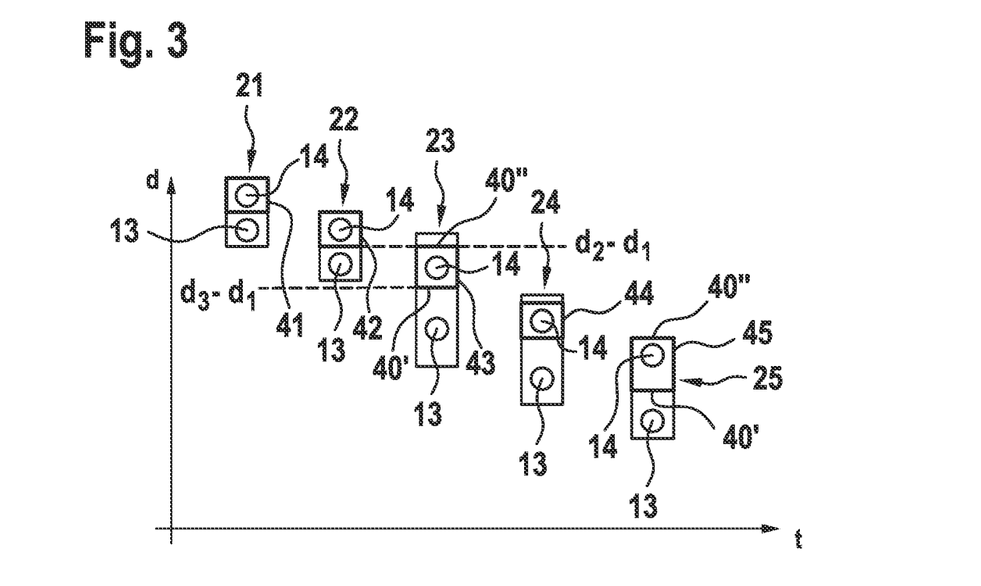
FIG. 3 shows first and second ultrasound signals of different cycles.

FIG. 3 schematically shows first ultrasonic signals 13 and second ultrasonic signals 14, acquired in five successive measurement cycles 21, 22, 23, 24, and 25. Here, time is plotted on the x axis, and distance d, calculated from the respective echo runtime, is plotted on the y axis. In each of the measurement cycles 21, 22, 23, 24, and 25, a first ultrasonic signal 13 and a second ultrasonic signal 14 were received. The distances corresponding to ultrasonic signals 13, 14 increase for successive measurement cycles, which means that during the measurement the acquiring ultrasonic sensor 12 has moved towards reflecting object 30. In addition, for each measurement cycle 21, 22, 23, 24, and 25, the expectation window 41, 42, 43, 44, and 45, calculated from first acquired ultrasonic signal 13, is shown. Here, the respective lower distance bound 40' of an expectation window 41, 42, 43, 44, and 45 is calculated from a minimum object height s, and the upper distance bound 40'' of the respective expectation window is calculated from the assumption of an object having a height H greater than sensor installation height h. The two boundary values are preferably calculated on the basis of potentially occurring measurement errors having a tolerance $tol_{max}$ for upper distance boundary 40'', or a tolerance $tol_{min}$ for lower distance boundary 40'.

In the vehicle, the actual sensor installation height h varies as a function of the state of loading of the vehicle. If the vehicle is empty (unloaded), a higher sensor installation height $h_{unloaded}$ may result than in the loaded state, in which a lower sensor installation height $h_{loaded}$ results. Typically, the sensor installation height h varies by approximately 5 to 10 cm, depending on the vehicle type. In the calculation of the upper and lower distance boundaries 40' and 40'', this effect can be taken into account, for example by using the two heights, $h_{unloaded}$ for upper distance boundary 40'' in order to obtain a larger value, and $h_{loaded}$ for lower distance boundary 40' in order to obtain a smaller value.

The calculation of upper distance boundary 40'' can accordingly take place for example according to the following rule:

$$d_{1,max} = \sqrt{h_{unloaded}^2 + d_{2,ref}^2}$$

upper distance boundary $= d_{1,max} - d_{2,ref} + tol_{max}$

The calculation of lower distance boundary 40' can take place for example according to the following rule:

$$d_{1,min} = \sqrt{h_{loaded}^2 + d_{2,ref}^2 - (h_{loaded} - s)^2}$$

lower distance boundary $= d_{1,min} - d_{2,ref} - tol_{min}$ where $d_{2,ref}$ corresponds in each case to the direct echo distance, i.e. the distance to point 32 situated directly opposite ultrasonic sensor 12.

In each of the measurement cycles 21, 22, 23, 24, and 25, a second ultrasonic signal 14 is acquired within the respective measurement window 41, 42, 43, 44, and 45. For each measurement cycle 21, 22, 23, 24, and 25, a signal group can thus be formed from the acquired ultrasonic signals 13 and 14. By determining a significance for each of the ultrasonic signals 13 and 14, as shown with reference to FIG. 1 and the subsequent comparison of the significances, each signal group can be assigned to a first or to a second echo group. A rate can now be calculated respectively for the first echo group and the second echo group over the measurement cycles. The rates can be compared with defined first and second threshold values in order to carry out an evaluation of the height of object 30. In addition, the sum of the first rate and the second rate can be compared with a third threshold value. In a possible embodiment of the present invention, for example the first threshold value $s_1$ (for the first rate of the first echo group) is defined as $s_1 = 40\%$. Second threshold value $s_2$ (for the second rate of the second echo group) is also defined as $s_2 = 40\%$ in this example. Third threshold value $s_3$ for the sum of the first rate and the second rate is defined as $s_3 = 60\%$.

If the measurement now yields a first rate of 35% and a second rate of 30%, then first threshold value $s_1$ and second threshold value $s_2$ have not been exceeded. However, the sum of the rates, 65%, exceeds third threshold value $s_3$, so that the height of object 30 is evaluated as not capable of being driven over.

Figure 4:
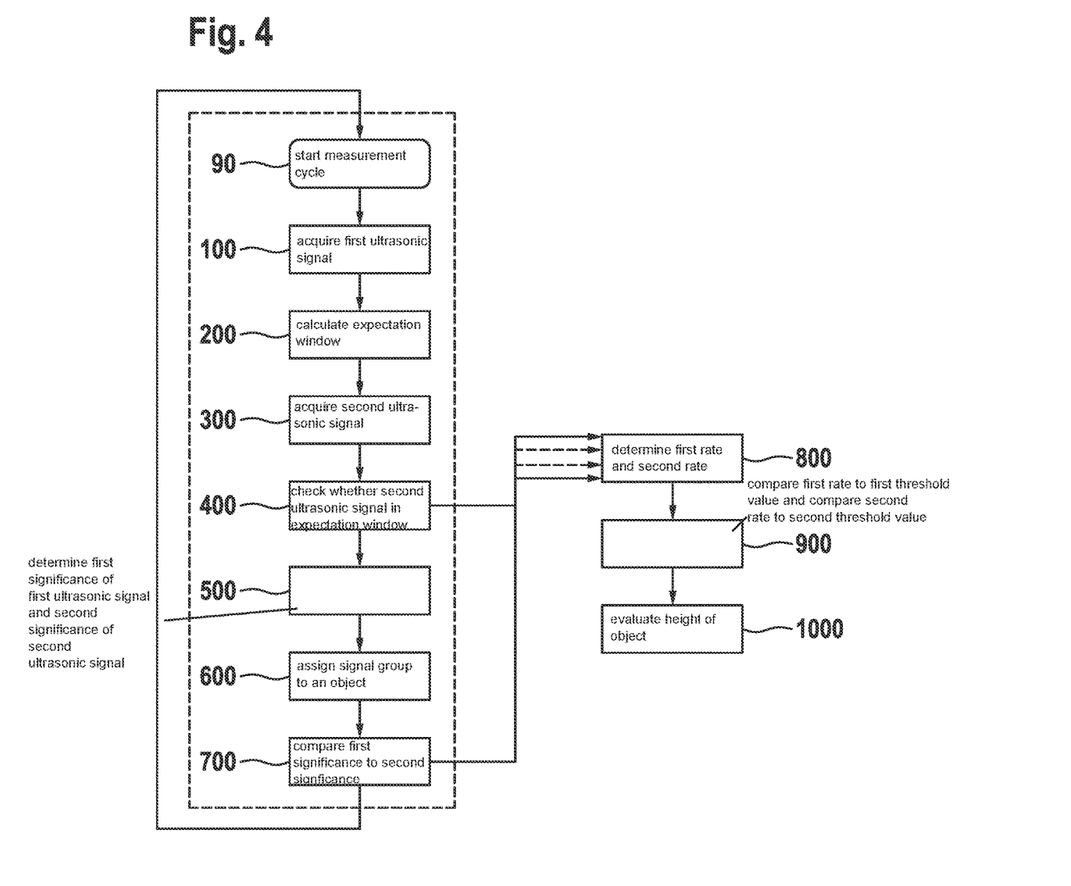
FIG. 4 shows a method according to an exemplary embodiment of the present invention in the form of a flow diagram.

FIG. 4 shows a method according to an exemplary embodiment of the present invention in the form of a flow diagram.

In step 90, a measurement cycle is started. Here an ultrasonic signal is emitted into the surrounding environment of the vehicle, for example by an ultrasonic sensor mounted on a vehicle.

In step 100, a first ultrasonic signal is acquired as an edge reflection or as a directly traveling echo of a high object.

In step 200, based on the acquired first ultrasonic signal, an expectation window is calculated for an associated interior-corner reflection.

In step 300, a second ultrasonic signal is acquired.

In step 400, it is checked whether the second ultrasonic signal was acquired within the expectation window. If yes, the second ultrasonic signal is identified as an interior-corner reflection associated with the first ultrasonic signal, and the first ultrasonic signal and the second ultrasonic signal are combined to form a signal group. If no, this result is outputted.

In step 500, a first significance of the first ultrasonic signal is determined and a second significance of the second ultrasonic signal is determined, the significance of each acquired ultrasonic signal indicating a probability that the acquired ultrasonic signal is a reflection of an emitted ultrasonic signal by at least one object.

In step 600, the signal group is assigned to an object in the surrounding environment of the vehicle.

In step 700, a comparison takes place of the first significance and the second significance. As a function of the result of the comparison, the signal group is assigned to a first echo group or to a second echo group. The result of the assignment is outputted. A new measurement cycle then begins.

Results of the assignment of known signal groups are acquired over a plurality of measurement cycles.

In step 800, for the respective last 16 measurement cycles a first rate is determined for the assignment of known signal groups to the first echo group, and a second rate is determined for the assignment of known signal groups to the second echo group. All measurement cycles are counted, including those in which for example a second ultrasonic signal was not acquired in the expectation window, or if no valid significance of an ultrasonic signal could be determined.

In step 900, the first rate of assignment of a signal group to the first echo group is compared with a first threshold value $s_1$, and the second rate of assignment of a signal group to the second echo group is compared with a second threshold value $s_2$.

Moreover, the sum of the first rate and the second rate are compared with a third threshold value $s_3$, the third threshold value in particular being greater than the two threshold values $s_1$ and $s_2$.

In step 1000 there takes place an evaluation of the height of the object based on the comparison. In particular, an object can be evaluated as not capable of being driven over if at least one of the threshold values $s_1$, $s_2$, or $s_3$ has been exceeded.

What is claimed is:

1. A method for evaluating an object height using ultrasonic signals acquired by an ultrasonic sensor mounted on a vehicle, the method comprising the following steps:
   in each measurement cycle:
   a. acquiring a first ultrasonic signal as an edge reflection or as a directly traveling echo of an object;
   b. calculating an expectation window for an associated interior-corner reflection;
   c. acquiring a second ultrasonic signal;
   d. when the second ultrasonic signal is acquired in the expectation window, identifying the second ultrasonic signal as an interior-corner reflection associated with the first ultrasonic signal, and combining the first ultrasonic signal and the second ultrasonic signal to form a signal group;
   e. determining a first significance of the first ultrasonic signal and determining a second significance of the second ultrasonic signal, the significance of each acquired ultrasonic signal of the first and second ultrasonic signals indicating a probability that the acquired ultrasonic signal is a reflection of an emitted ultrasonic signal by at least one object;
   f. assigning the signal group to an object in a surrounding environment of the vehicle;
   g. comparing the first significance and the second significance and, as a function of the comparison, assigning the signal group to a first echo group or to a second echo group;
   determining a first rate of the assignment of a signal group to the first echo group over a determined number of measurement cycles;
   determining a second rate of the assignment of the signal group to the second echo group over the determined number of measurement cycles;
   evaluating the object height as a function of the first rate and the second rate.

2. The method as recited in claim 1, wherein the calculation of the expectation window takes place based on a runtime of the first ultrasonic signal, and/or an installation height of the ultrasonic sensor, and/or a height threshold value.

3. The method as recited in claim 1, wherein the significance of the first ultrasonic signal and/or the significance of the second ultrasonic signal is determined based on at least one parameter that contains items of information that are contained in a received signal, the items of information including an amplitude and/or a correlation factor, the received signal being produced by the ultrasonic sensor from ultrasonic signals received by the ultrasonic sensor during the measurement cycle, and the significance being determined by:
   dividing a spatial region that extends from the ultrasonic sensor up to a maximum range of the ultrasonic sensor into a plurality of continuous and successive subregions, and selecting the at least one parameter to be used for the evaluation of the significance of each received ultrasonic signal of the first and second ultrasonic signals from a predefined parameter group, as a function of a position of the subregion in which the corresponding ultrasonic signal originated.

4. The method as recited in claim 1, wherein the significance of each of the first and second ultrasonic signal is evaluated using a significance scale having a plurality of discrete significance levels, the determination of the significance of the first ultrasonic signal and/or of the significance of the second ultrasonic signal taking place by assigning a determined significance level to the first and/or second ultrasonic signal.

5. The method as recited in claim 4, wherein four significance levels are provided, including a first significance level "low," a second significance level "medium," a third significance level "high," and a fourth significance level "very high," the first significance level "low" corresponding to a low probability that an ultrasonic signal originates from a reflection of an emitted ultrasonic signal by at least one object, the second significance level "medium" corresponding to a medium probability that an ultrasonic signal originates from a reflection of an emitted ultrasonic signal by at least one object, the third significance level "high" corresponding to a high probability that an ultrasonic signal originates from a reflection of an emitted ultrasonic signal by at least one object, and the fourth significance level "very high" corresponding to a very high probability that an ultrasonic signal originates from a reflection of an emitted ultrasonic signal by at least one object.

6. The method as recited in claim 5, wherein the signal group including the first ultrasonic signal and the second ultrasonic signal is assigned to the first echo group when the difference between the first significance and the second significance is low, in particular when both ultrasonic signals have the same significance level, or when the first ultrasonic signal has a very high significance, in particular the significance level "very high."

7. The method as recited in claim 6, wherein the signal group including the first ultrasonic signal and the second ultrasonic signal is assigned to the second echo group when the first ultrasonic signal has a low significance, in particular the significance level "low," and the second ultrasonic signal has a significance that is high in comparison to the first ultrasonic signal, in particular one of the significance levels "high" or "very high."

8. The method as recited in claim 1, wherein the assignment of the signal group to an object in the surrounding environment of the vehicle takes place through trilateration.

9. The method as recited in claim 1, wherein the evaluation of the object height takes place in that the determined first rate of the assignment of the signal group to the first echo group is compared with a first threshold value and/or the determined second rate of the assignment of a signal group to the second echo group is compared with a second threshold value and/or a sum of the first rate and the second rate is compared with a third threshold value.

10. The method as recited in claim 9, wherein the third threshold value is greater than the first threshold value, and the third threshold value is greater than the second threshold value.

11. The method as recited in claim 1, wherein the object height is evaluated as to whether or not the vehicle can drive over the object without risk.

12. The method as recited in claim 1, wherein the evaluation of the object height as a function of the first rate and the second rate takes place only when the vehicle is moving, or, when the vehicle is standing still, higher evaluation threshold values are used in the evaluation.

13. An ultrasonic sensor system for a vehicle, comprising:
at least one ultrasonic sensor configured to emit ultrasonic signals and to acquire ultrasonic signals that are reflections by an object of the emitted ultrasonic signals; and
a computing unit configured to evaluate an object height of the object using the ultrasonic signals acquired by the ultrasonic sensor, the computing unit configured to:
in each measurement cycle:
   a. acquire a first ultrasonic signal as an edge reflection or as a directly traveling echo of an object;
   b. calculate an expectation window for an associated interior-corner reflection;
   c. acquire a second ultrasonic signal;
   d. when the second ultrasonic signal is acquired in the expectation window, identify the second ultrasonic signal as an interior-corner reflection associated with the first ultrasonic signal, and combine the first ultrasonic signal and the second ultrasonic signal to form a signal group;
   e. determine a first significance of the first ultrasonic signal and determine a second significance of the second ultrasonic signal, the significance of each acquired ultrasonic signal of the first and second ultrasonic signals indicating a probability that the acquired ultrasonic signal is a reflection of an emitted ultrasonic signal by at least one object;
   f. assign the signal group to an object in a surrounding environment of the vehicle;
   g. compare the first significance and the second significance and, as a function of the comparison, assigning the signal group to a first echo group or to a second echo group;
determine a first rate of the assignment of a signal group to the first echo group over a determined number of measurement cycles;
determine a second rate of the assignment of the signal group to the second echo group over the determined number of measurement cycles;
evaluate the object height as a function of the first rate and the second rate.

14. A non-transitory computer-readable medium on which is stored a computer program including program code for evaluating an object height using ultrasonic signals acquired by an ultrasonic sensor mounted on a vehicle, the program code, when executed by a computer, causing the computer to perform the following steps:
in each measurement cycle:
   a. acquiring a first ultrasonic signal as an edge reflection or as a directly traveling echo of an object;
   b. calculating an expectation window for an associated interior-corner reflection;
   c. acquiring a second ultrasonic signal;
   d. when the second ultrasonic signal is acquired in the expectation window, identifying the second ultrasonic signal as an interior-corner reflection associated with the first ultrasonic signal, and combining the first ultrasonic signal and the second ultrasonic signal to form a signal group;
   e. determining a first significance of the first ultrasonic signal and determining a second significance of the second ultrasonic signal, the significance of each acquired ultrasonic signal of the first and second ultrasonic signals indicating a probability that the acquired ultrasonic signal is a reflection of an emitted ultrasonic signal by at least one object;
   f. assigning the signal group to an object in a surrounding environment of the vehicle;
   g. comparing the first significance and the second significance and, as a function of the comparison, assigning the signal group to a first echo group or to a second echo group;
determining a first rate of the assignment of a signal group to the first echo group over a determined number of measurement cycles;
determining a second rate of the assignment of the signal group to the second echo group over the determined number of measurement cycles;
evaluating the object height as a function of the first rate and the second rate.

* * * * *